Nov. 3, 1964   J. H. JOHNSON ETAL   3,155,010
ROTARY HYDRAULIC APPARATUS
Original Filed April 20, 1959   3 Sheets-Sheet 1

INVENTOR.

BY

ATTORNEY

Nov. 3, 1964  J. H. JOHNSON ETAL  3,155,010
ROTARY HYDRAULIC APPARATUS
Original Filed April 20, 1959   3 Sheets-Sheet 2

INVENTOR.

BY

ATTORNEY

Nov. 3, 1964    J. H. JOHNSON ETAL    3,155,010
ROTARY HYDRAULIC APPARATUS
Original Filed April 20, 1959    3 Sheets-Sheet 3

*INVENTOR.*

*BY*

*ATTORNEY*

United States Patent Office 3,155,010
Patented Nov. 3, 1964

3,155,010
ROTARY HYDRAULIC APPARATUS
John H. Johnson and Arthur S. Irwin, Jamestown, N.Y., assignors to Marlin-Rockwell Corporation, Jamestown, N.Y., a corporation of Delaware
Continuation of application Ser. No. 807,613, Apr. 20, 1959. This application Sept. 18, 1962, Ser. No. 224,322
7 Claims. (Cl. 91—175)

This invention relates to rotary hydraulic apparatus and is directed particularly to the balancing of the forces applied in transferring the fluid between the rotary and stationary members.

This is a continuation of our co-pending application Serial No. 807,613 filed April 20, 1959 and entitled "Fluid Drive" and now abandoned.

An object of the invention is to provide a rotary hydraulic apparatus with the fluid and sealing forces acting on the cylinder block being balanced.

Another object of the invention is to provide a rotary hydraulic apparatus having pistons forming a variable chamber which have a plurality of strokes for each revolution of the apparatus.

Another object of the invention is to provide a rotary hydraulic apparatus which operates at low speeds and high power transmission.

Further objects and advantages of the invention will be apparent from the following description taken in connection with the accompanying drawings, in which FIG. 1 illustrates a sectional view of the hydraulic drive taken through lines 1—1 of FIG. 2;

FIG. 5 is a fragmentary sectional view of a lobe taken along lines 5—5 of FIG. 4.

Figure 1:
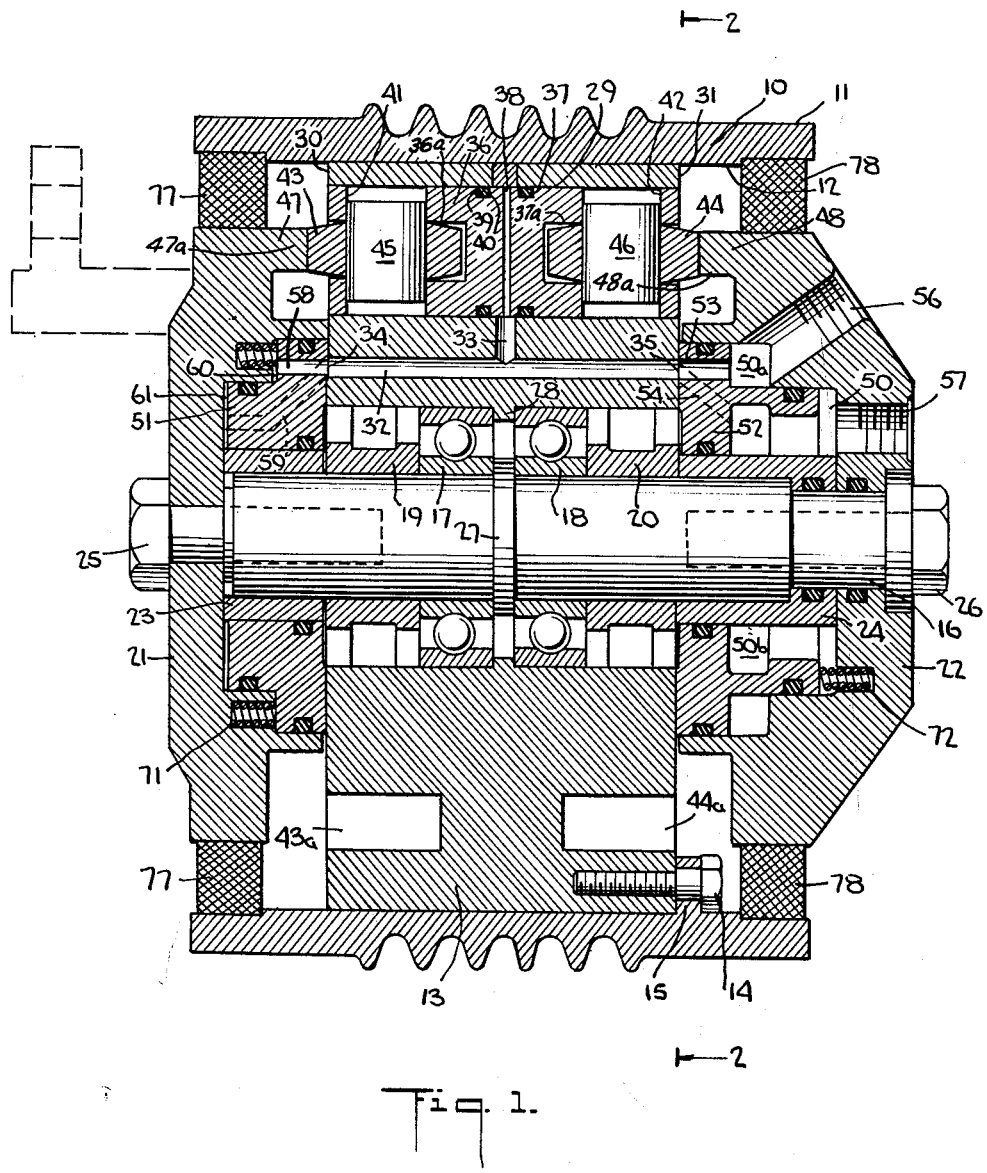
Figure 2:
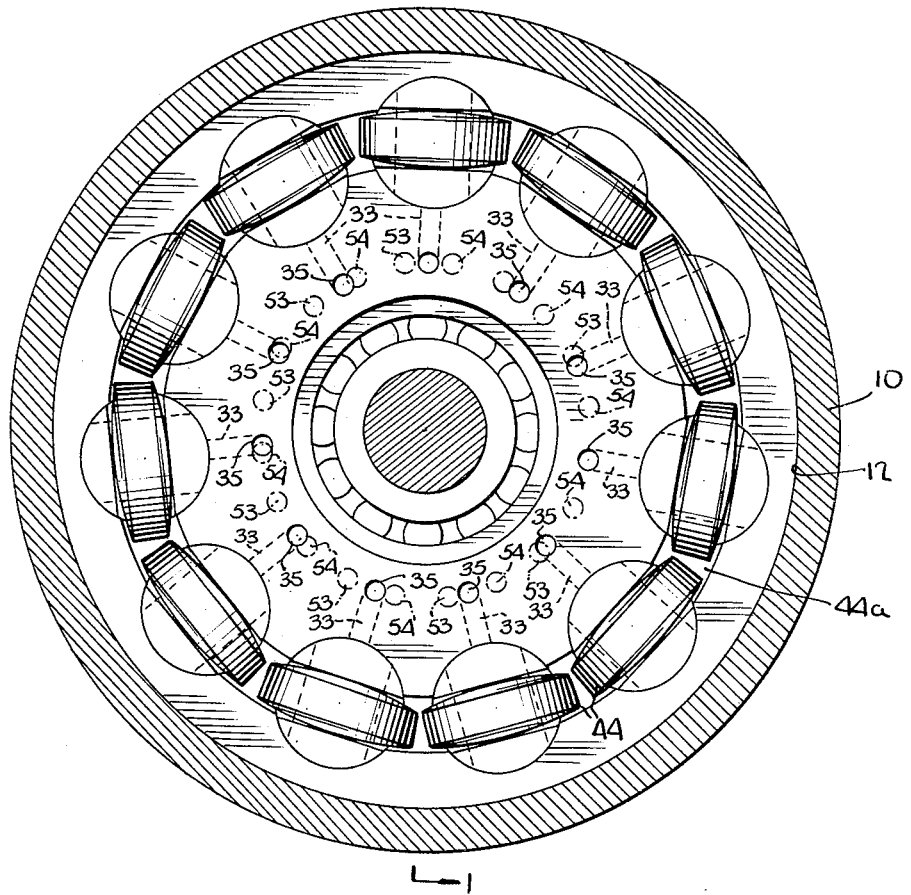
FIG. 2 is a sectional view of the valve plate and a view of the side of the cylinder block.

The invention is specifically described in connection with a winch drive. The winch drum 10 is cylindrical in shape and has an outer surface 11 and an inner surface 12 forming an inner cylindrical space for housing the hydraulic drive unit. A cylinder block 13 is snugly fitted inside the drum engaging the surface 12. Splines and grooves are provided to transmit the torque. Bolts 14 and flanges 15 are circumferentially spaced around the drum and integral therewith to carry any axial forces and hold the drum and cylinder block in axial relation. The drum and cylinder block are rotatably mounted on a fixed shaft 16 by means of ball bearings 17 and 18 and roller bearings 19 and 20. The roller bearings carry the radial pressures and the ball bearings carry the axial thrusts. The shaft 16 is supported in fixed position by the end plates 21 and 22 secured to the shaft by bolts 25 and 26. Either of the end plates may be firmly secured to a frame (not shown) by means of flanges (not shown) to support the unit and fixedly hold the end plates.

The bearings are held in place by means of sleeve 23 and 24 mounted on the shaft and bearing against the end plates 21 and 22, respectively. The shaft 16 has a midpoint flange 27 for positioning the bearings, and the cylinder block 13 has an annular flange 28 fitting between the bearings to position the cylinder block. Thus, the drum 10 and cylinder block 13 are mounted to rotate in relation to the fixed shaft 16 and end plates 21 and 22.

Around the outer circumferential portion of the cylinder block is a plurality of odd number of circumferentially spaced cylinder bores 29 having the central axis extending parallel to the axis of the shaft 16. The cylinders extend through the cylinder block forming openings in the side surfaces 30 and 31. Extending longitudinally within the cylinder and positioned radially inside of the bores 29 are cylindrical passages 32 for supplying liquid to and discharging liquid from the cylinders and transmitting fluid pressure to the balancing means on the opposite side of the cylinder block from the intake and exhaust means. Each of the passages is connected to a respective cylinder by a radially extending port passage 33. The passages 32 extend through the cylinder block to form openings 34 and 35 in the side surfaces 30 and 31. The passages are circumferentially spaced around the cylinder block. There is one passage for each cylinder bore 29.

Each of the cylinder bores has opposing pistons 36 and 37, reciprocally moving in opposite directions to vary the chamber 38 formed by the walls of the cylinder bore and the ends of the pistons. The pistons may have annular grooves 39 and O-rings for sealing the chamber 38. However, the clearance between a respective piston and the cylinder provides satisfactory mechanical operation and also provides a satisfactory seal. The port passage 33 is positioned at the midportion of the bore so that the ends of the pistons do not completely cover the port passage and thereby maintain the chamber 38 in communication with the discharge and supply. The pistons 36 and 37 have bores 41 and 42, respectively, for supporting rollers 43 and 44 by means of the shafts 45 and 46. Slots 36a and 37a extend longitudinally through the end of the piston for housing the rollers 43 and 44. On each side of the cylinder bores are slots 43a and 44a for receiving the rollers. The rollers 43 and 44 engage the cams 47 and 48 on the end plates 21 and 22, respectively.

Figure 3:
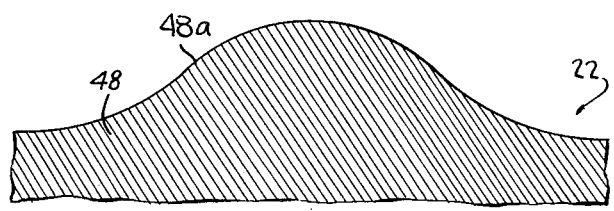
FIG. 3 is a side view of the valve plate.
Figure 3:
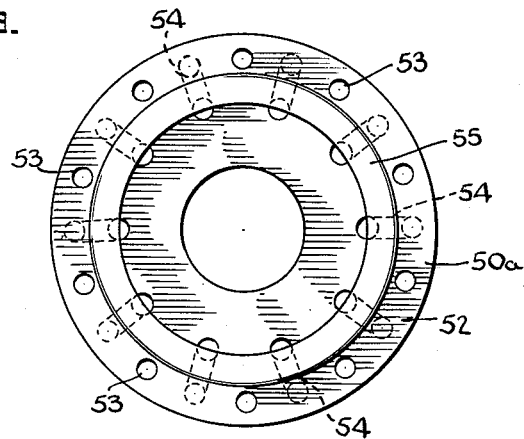
Figure 4:
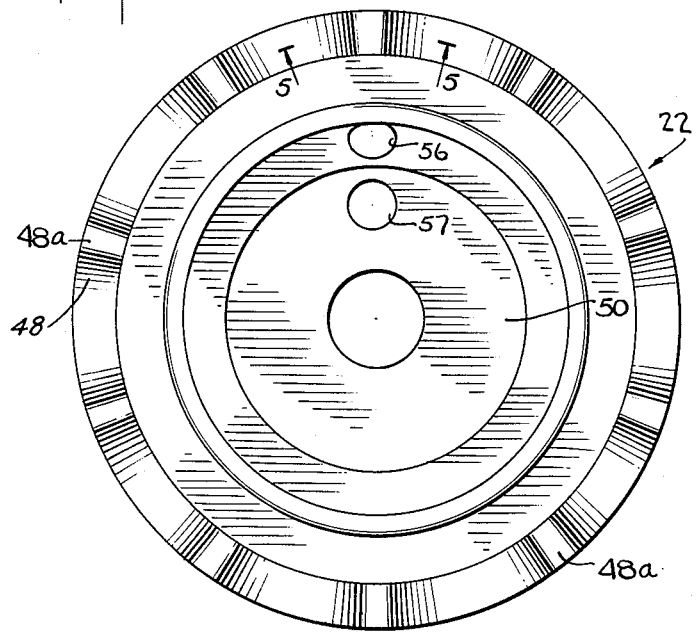
FIG. 4 is a side view of the end plate illustrating the multilobe cam.

The cams 47 and 48 each have a plurality of axially extending lobes so that on a single revolution of the cylinder block the pistons 36 and 37 reciprocate through a plurality of strokes to provide a plurality of power strokes for each revolution of the cylinder block and drum. The number of lobes should preferably be less than the number of cylinders. Thus, the cams have an undulatory cam surface engaged by the rollers 43 and 44. For each lobe a pair of intake and exhaust passages 53 and 54, is provided to deliver and discharge fluid to the passage 32 on each stroke. These passages are indicated in FIG. 3. The intake passages 53 extend parallel to the axis through the valve plate 52. The exhause passages 54 are at an angle and are indicated by dash lines. The intake and exhaust passages successively communicate with the passage 32 to deliver and receive hydraulic fluid. Each of the lobes 47a and 48a is positioned in relation to the respective pairs of intake and exhaust passages so that the peak of the lobe is midway between the intake and exhaust ports of a given pair. The cam lobes 47a and 48a are symmetrical so that the rising surface is the same as the descending surface. This permits the operation of the unit in either direction. For maximum torque it is preferable that the lobes of the cam 47 be axially aligned with the lobes of the cam 48 so that the pistons 36 and 37 move in unison. The axial pressure transmitted between the cams 47 and 48 and the rollers 43 and 44, respectively, is cancelled or balanced through the shaft 16 by means of the bolts 25 and 26. The radial fluid pressure cancels within the cylinder block so that no axial or radial forces of any magnitude are applied to the roller bearings 19 and 20 and the axial bearings 17 and 18. The rotative torque is transmitted between the rollers 43 and 44 and the cam surfaces of the cams 47 and 48 is applied to the cylinder block through the pistons 36 and 37. The cylinder block rotates the drum 10 by means of the splines and the grooves. The end plates 21 and 22 are held in fixed position by means of a frame supporting the unit. Thus, the end plates 21 and 22 are held against rotation. The end plates 21 and 22 may also be held against rotation by providing splines on the shaft 16 which fit in grooves on the end plates 21 and 22.

The end plates 21 and 22 have inner annular spaces 49 and 50 around the sleeves 23 and 24. Balancing block 51 and valve block or plate 52, each having a generally ring shape, fit in the spaces 49 and 50, respectively. As illustrated in FIG. 3, the valve block 52 has a plurality of supply passages 53 and a plurality of discharge passages 54. A sleeve-shaped portion 55 separates the remainder of the space 50 into annular chambers 50a and 50b for receiving the liquid under pressure from the port 56 and passing the liquid discharged to port 57 (FIG. 1). As previously described, for each cam lobe a pair of discharge and supply passages 54 and 53 is provided.

On the other side of the cylinder block the block 51 has passages or recesses 58 and 59 communicating with the passages 32 in the cylinder block. The passages 58 and 59 are coupled by the annular chambers 60 and 61, respectively, for supplying liquid to the chambers for creating axial pressures to press the block against the cylinder block so that a force is created against the cylinder block to balance the valve plate pressure. The passages 58, 59 and chambers 60, 61 form a closed system for applying balancing pressures against the end of the cylinder block opposite to the valve means.

The chambers 50a and 50b are continuously filled with hydraulic fluid under pressure. This pressure is applied to the back surface of the valve plate to press the valve against the cylinder block and seal the passage of fluid between the intake and exhaust passages and the passage 32. As described later herein in connection with a more specific description of the unit, over a given arc the intake passages are in communication with the passages 32 and on the other side of the winch unit the discharge passages are in communication with the respective passages 32. This creates a greater separating force on the intake side than on the discharge side.

O-rings 62, 63, 64, 65, 66, 67, 68, 69 and 70 are provided to seal the spaces and chambers. Springs 71 and 72 provide an initial sealing pressure on block 51 and plate 52, respectively.

In this particular embodiment eleven cylinder bores with two pistons each are provided and an even number of lobes are provided on each cam so that each lobe extends over thirty-six degrees and the cylinder bores are spaced thereby thirty-three and one-third degrees. Thus, the pistons are engaging the cams at different lobe angles so that the application of power is distributed.

Considering more specifically the operation of the invention in accordance with this embodiment, a hydraulic liquid is supplied under high pressure through the port 56 from a hydraulic pump and supply (not shown). The liquid passes into the annular chamber 50a and the supply passage 53 for delivery to a respective passage or passages 32 as the cylinder block 13 rotates and moves the openings 35 into alignment with the supply passage 53. There are an even number of passages 53 and an even number of passages 54 corresponding to the number of lobes on the cams 47 and 48. There is an odd number of passages 32 corresponding to the odd number of cylinder bores 29. Thus, the relationship between the passages 32 and the passages 53 and 54 does not vary in timed relation. The passages 53 and 54 are fixed in relation to the maximum amplitude of a respective cam lobe. The relationship is set so that as the passage 32 commences to communicate with the passage 53 the rollers 43 and 44 are moving off of the top of the lobe onto the side. The liquid in the passages 32 and 33 and the chamber 38 is placed under high pressure, forcing the pistons 36 and 37 apart. The high pressure force applied to the end of the piston presses the rollers against the lobe of the cam. This creates a circumferential component rotating cylinder block. The rotational force is applied through the rollers 43 and 44, shafts 45 and 46, and pistons 36 and 37 to the cylinder block. The axial force is applied to the end plates 21 and 22 and is cancelled through the bolts 25 and 26 and the shaft 16.

Considering in detail the supply and discharge of fluid to the cylinder block, the number of cylinders being supplied with or discharging fluid varies in this embodiment between four and five cylinders. As illustrated in the sectional view, when five cylinders are in communication with the supply means an arc of approximately 150° is subtended. When four cylinder bores are connected, an arc of 110° is subtended. This arc varies between these two limits and moves in the direction of rotation of the cylinder block at a high rate.

The ports of passages 53 which pass the high pressure fluid are evenly distributed circumferentially around the shaft 16 and each applies a separating force or pressure between the cylinder block and the valve plate since the passages 53 are always in communication with the high pressure chamber 50a. This separating force is, therefore, balanced around the shaft 16. An unbalanced separating force is produced by the partial overlapping of the supply passages 32 with the ports 53 over the arc when the supply passages are in communication with the ports 53. This unbalance is substantially less than in the conventional two-port valve plate. In this embodiment the ratio of the unbalance is in the order of 8:5 as compared to a ratio of 1:0 in a conventional two-port valve plate. An evenly distributed sealing force is applied to the back of the valve plate by means of the pressure of the fluid in the chamber 50a bearing against the annular radial surface of the valve plate through which the ports 53 extend. Also, a sealing force is applied by the pressure of the discharge fluid in the annular chamber 50b which bears against the radial wall of the valve plate. Thus, at all times there is an even pressure applied to the back of the valve plate. Thus, it is seen that the separating force is sufficiently distributed circumferentially around the shaft 16 to permit the valve plate to be balanced by the annulus of pressure applied to the back of the valve plate.

The block 51 forms a pressure balancing means and functions in a similar manner to the valve plate or valve means to provide an opposing pressure or force on the cylinder block to balance the pressure of the valve plate 52. The fluid pressure in the chambers 60 and 61 provides a pressure against the cylinder block in a similar manner that the fluid pressure in the chambers 50a and 50b provides a pressure against the valve plate. The passages 58 and 59 correspond in a similar manner to the passages 53 and 54 in applying fluid pressure against the sides or ends of the cylinder block. If the high pressure passages 53 are supplied with high pressure fluid from the annular chamber 50a, the passages 58 will be correspondingly supplied with high pressure fluid from the annular chamber 60. Thus for fluid pressure applied by each passage 53 on the opposite end of the cylinder block, there is a corresponding passage 58. Further, when the passages 53 and 58 are in an overlapping relation with the passage 32 in the cylinder block a partial pressure is developed on the balance block end with the partial pressure developed on the valve plate end of the cylinder block.

Circumferentially extending shaft seals 77 and 78 of a conventional type are provided between the rotating casing 10 and the stationary end plates 21 and 22, respectively, for sealing the chamber formed by the rotating casing 10 and the end plates.

With the block 51 and the valve plate 52 variable under the annular pressures in the chamber 50a, 50b, 60 and 61, the pressurized fluid may be supplied either through the ports 56 or 57 and the cylinder block 13 may be held by the bearings 17 and 18 so as not to have any axial play.

The eleven opposing pistons are circumferentially arranged and the ten lobes on each cam provide 220 piston strokes. Thus, a high driving force is created. Also, at any instant at least eight to ten pistons are applying a driving force. Less than ten lobes and corresponding pairs of intake and discharge passages may be used. With less than ten lobes the unbalanced separating force is further distributed circumferentially, thus further reducing the tendency of the valve plate to separate from the cylinder block. The average output torque is directly proportional to displacement and the instantaneous torque output is a summation of the pistons to which the high fluid pressure is being applied. These individual torques vary sinusoidally. The summation is essentially constant since the number of lobes and pistons differs and each piston is at a different position on the lobe. The large number of strokes also provides the smooth operation. Thus, a smooth running, high torque winch unit is provided within small volume and without the necessity of reduction gears.

Various modifications and change may be made in the apparatus without departing from the invention as set forth in the appended claims.

We claim:

1. A hydraulically driven motor comprising a separate cylindrically shaped cylinder block having opposite sides and supported for rotation about an axis, said cylinder block having a plurality of circumferentially spaced cylinder bores extending parallel to the axis of the cylinder block, a pair of pistons end to end in each of said bores, separate fluid supply passage means for each respective cylinder bore extending parallel to the axis of said cylinder block from the side of said cylinder block to said cylinder bore for transferring fluid therebetween, cam means on each side of said cylinder block for operating respective pistons with each cam means having a plurality of cam lobes less than the number of cylinder bores for actuating each pair of pistons through a plurality of strokes for each rotation of the cylinder block, valve means engaging one side of said cylinder block and having a pair of supply and discharge passages for each cam lobe on one side to deliver and receive fluid on each stroke of a respective pair of pistons and separable annular supply and exhaust chambers formed on the side of the valve means opposite to said cylinder block for producing substantially uniform annular sealing pressure against said cylinder block, said pistons rotating said cylinder block by the reaction forces between said lobes and said cylinder block created by the fluid pressure acting on said pistons.

2. A hydraulic apparatus comprising cylinder block means having radially extending sealing surfaces on opposite sides respectively and a plurality of cylindrical bores circumferentially spaced around an axis and extending generally longitudinally to the axis, piston means reciprocally mounted in said bores to produce a variable chamber in each bore, separate hydraulic fluid conveying means in said cylinder block means for each of said bores and extending to the sealing surfaces on opposite sides of the cylinder block means from a respective chamber, valve means in rotatable and sealing surface engaging relation with said cylinder block means and in fluid transfer relation with said fluid conveying means, cam means having a plurality of lobes for engaging the ends of the piston means for reciprocally moving said piston means, said valve means having a pair of inlet and exhaust passages for each respective lobe for receiving and passing fluid from said fluid conveying means and having means creating a sealing pressure against said sealing surface, and balance means in rotatable and sealing surface engaging relation with said cylinder block on the opposite side from said valve means and receiving fluid pressure from said fluid conveying means to balance the pressure of said valve means against said cylinder block.

3. A hydraulic apparatus comprising cylinder block means having radially extending sealing surfaces on opposite sides respectively and a plurality of cylindrical bores circumferentially spaced around an axis and extending generally longitudinally to the axis, piston means reciprocally mounted in said bores to produce a variable chamber in each bore, separate hydraulic fluid conveying means in said cylinder block means for each of said bores and extending to said sealing surfaces on opposite sides of the cylinder block means from a respective chamber, valve means in rotatable relation with said cylinder block means and engaging one of said sealing surfaces, cam means having a plurality of lobes for engaging the ends of the piston means for reciprocally moving said piston means, said valve means on one radially extending sealing surface having passage means for passing fluid for each respective lobe for interchange of fluid with said fluid conveying means and having means creating a sealing pressure by said valve means against one of said sealing surfaces, and balance means engaging said other sealing surface and having means for receiving fluid pressure from said fluid conveying means to balance the pressure of said valve means against said cylinder block.

4. In a hydraulic apparatus having a rotating cylinder block having a plurality of pistons and hydraulic fluid supply passages extending generally longitudinally to the axis of rotation, a radially extending valve plate having a number of pairs of intake and exhaust passages and separate annular supply and exhaust chambers formed on the side of the valve plate opposite to said cylinder block for transference of fluid with said passages and for providing a sealing pressure applied uniformly circumferentially around said valve plate for sealing said valve plate against said cylinder block.

5. A rotary hydraulic apparatus of the axial type comprising an axially orientated cylinder block having pressure balancing means and valve means at opposite ends and in rotatable relation with said cylinder block about a main axis, said cylinder block having a plurality of bores each with reciprocating opposing pistons having high pressurized fluid therebetween during a part of each cycle, fluid conveying means in said cylinder block extending from said bores between a respective pair of pistons to said valve means at one end and to said pressure balancing means at the other end, said valve means having a plurality of fluid passages communicating with said fluid conveying means for interchange of fluid with said bores, and said pressure balancing means having recesses open against the end of the cylinder block for receiving fluid under pressure to match the pressure of the fluid in said passages in said valve means for balancing the pressure applied to said cylinder block by the fluid in said passages.

6. A rotary hydraulic apparatus as set forth in claim 5 wherein said valve means and said pressure balancing means have annular chambers coupling said passages and said recesses respectively for applying opposing uniform balancing sealing pressure to said cylinder block.

7. A rotary hydraulic apparatus of the axial type comprising an axially orientated cylinder block having pressure balancing means and valve means at opposite ends and in rotatable relation with said cylinder block about a main axis, said cylinder block having a plurality of bores with piston means forming variable chambers containing high pressurized fluid during a part of each cycle, fluid conveying means in said cylinder block extending from said respective chambers to said valve means at one end and to said pressure balancing means at the other end, said valve means having a plurality of pressurized fluid passages communicating with said fluid conveying means for interchange of fluid with said chambers, and said pressure balancing means having recesses with openings at the end of the cylinder block for receiving fluid under pressure to match the pressure of the fluid in said passages in said valve means for balancing the pressure applied to said cylinder block by the fluid in said passages.

References Cited in the file of this patent

UNITED STATES PATENTS

| | | |
|---|---|---|
| 2,364,301 | MacNeil | Dec. 5, 1944 |
| 2,980,077 | Magill | Apr. 18, 1961 |

FOREIGN PATENTS

| | | |
|---|---|---|
| 10,908 | Great Britain | May 8, 1913 |
| 1,128,136 | France | Oct. 20, 1956 |